United States Patent
Narayanaswamy et al.

(10) Patent No.: US 6,228,403 B1
(45) Date of Patent: May 8, 2001

(54) SHELF STABLE BROWNIE BATTER ARTICLE AND METHOD OF PREPARATION

(75) Inventors: Venkatachalam Narayanaswamy, Maple Grove; Linda R. Kreisman, St. Paul; James E. Langler, White Bear Lake; David W. Tobelmann, Plymouth, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/322,208

(22) Filed: May 28, 1999

(51) Int. Cl.$^7$ .................... A21D 4/00; A21D 13/00; A21D 10/04
(52) U.S. Cl. .................... 426/128; 426/392; 426/399; 426/552; 426/558; 426/561; 426/410
(58) Field of Search ..................... 426/552, 558, 426/561, 391, 399, 128, 392, 410

(56) References Cited

U.S. PATENT DOCUMENTS

| | | |
|---|---|---|
| 2,982,662 * | 5/1961 | Cochran ................................. 99/192 |
| 3,649,304 * | 3/1972 | Fehr, Jr. et al. ....................... 99/192 |
| 3,862,341 | 1/1975 | Johannes . |
| 4,353,932 * | 10/1982 | Bone ..................................... 426/532 |
| 4,774,099 | 9/1988 | Feeney et al. . |
| 4,940,595 | 7/1990 | Yasosky et al. . |
| 5,106,635 * | 4/1992 | McCutchan et al. ................. 426/107 |
| 5,384,139 * | 1/1995 | Vasseneit .............................. 426/128 |
| 5,409,720 | 4/1995 | Kent et al. . |
| 5,447,739 * | 9/1995 | Emanvelson et al. ................ 426/552 |
| 5,514,387 | 5/1996 | Zimmerman et al. . |
| 6,013,294 * | 1/2000 | Bunke et al. ......................... 426/120 |
| 6,039,994 | 3/2000 | LeFlecher et al. . |

FOREIGN PATENT DOCUMENTS

| | | |
|---|---|---|
| 0 868 850 A1 | 10/1998 | (EP) . |
| WO 89/02210 * | 3/1989 | (WO) . |
| WO 99/04640 * | 2/1999 | (WO) . |

* cited by examiner

*Primary Examiner*—Nina Bhat
(74) *Attorney, Agent, or Firm*—John A. O'Toole; Douglas J. Taylor; Janal M. Kalis

(57) ABSTRACT

A ready-to-bake batter article for brownies comprises a gas impermeable container, a low water activity high ratio brownie batter disposed within and partially filling the container and an unpressurized, inert low oxygen gas in the unfilled headspace. The ratio of sugar to flour in the batter ranges from about 1.5:1 to 3.5:1. The batter has a water activity of less than 0.85.

23 Claims, No Drawings

SHELF STABLE BROWNIE BATTER ARTICLE AND METHOD OF PREPARATION

FIELD OF THE INVENTION

The present invention relates to packaged food articles and to their methods of preparation. More particularly, the present invention relates to articles comprising a gas-impermeable container and a starch based batter for brownies that are storage stable at room temperature.

BACKGROUND

Baked goods such as brownies are popular consumer snack food and dessert food items. Traditional brownies are a particularly delectable baked dessert. A wide variety of recipes are currently available for use by consumers to prepare small quantities of brownies from various ingredients.

For greater convenience and shelf stability, dry mixes for brownies have long been available. The consumer mixes the dry mix with liquid ingredients such as water, milk and/or eggs to form a batter. The batter is then immediately poured into a baking pan and baked to form the finished baked goods.

Useful developments in the formulation of dry mixes for brownies continue to be made. For example, an improved dry mix for brownies is disclosed in U.S. Pat. No. 08/929,827 filed Sep. 15, 1997 by Palmer et al entitled "Dry Mix for Baked Goods with Gellan Gum and Method of Preparation" (which is incorporated herein by reference). The dry mixes for brownies disclosed therein include gellan gum in addition to other ingredients. The dry mixes not only are useful for preparing low fat, high quality finished baked goods by consumers for home use, but also can be used for the large scale production of finished baked goods suitable for refrigerated sales and distribution. While the formulation for the dry mix is improved, the dry mixes are packaged in a conventional manner in a sealed bag placed in a conventional carton.

While dry mixes for home use are convenient, current trends for consumer package food products favor products of even greater convenience. The present invention provides improved products of greater convenience. The present invention provides articles comprising ready-to-bake batters that are shelf stable at room temperatures.

Refrigerated ready-to-bake batters having relatively short shelf lives are also known. One problem with such products concern is bacterial growth. A second problem resides in providing a leavening system that retains functionality over extended storage. Acidifying the batter desirably extends bacterial stability but the acidity undesirably tends to interact with the leavening system. With poor leavening, the finished baked goods 30 exhibit undesirable volume and poor texture. The present invention provides ready-to-bake batters for brownies articles that are shelf stable even at room temperature.

The present articles thus provide the benefits combination of shelf stability of conventional dry mixes with the greater convenience of ready-to-bake batters.

The present invention resides in part in the surprising discovery that $CO_2$ gas producing leavening agent is not essential ingredients in the present packaged ready-to-bake batters.

SUMMARY OF THE INVENTION

In its product aspect, the present invention resides in ready-to-bake batter articles that provide improved finished baked goods, especially brownies. The articles comprise an unpressurized gas impermeable container, a high Ph, low water activity, high sugar to flour ratio batter disposed within the container and an inert low oxygen gas in the headspace not filled by the batter. The sugar to flour ratio ranges from 1.5:1 to about 3.5:1 The water activity is less than 0.85 the pH ranges from about 6.0 to 7.5. The headspace inert gas has an oxygen content of less than 4%, preferably less than 2%.

In its process aspect, the present invention is directed to processes for making a ready-to-bake batter article that is shelf stable at room temperature. The process comprising the steps of:

providing an open sealable, gas impermeable container;
dispensing a brownie batter within at least a portion of the container, said brownies comprising:
about 25 to 70% sugar
about 10 to 40% flour
about 0 to 5% egg solids
about 0.1 to 3% salt
about 0 to 4% emulsifiers
about 0 to 20% fat
about 5 to 20% moisture
said batter having a sugar to flour ratio of about 1.5:1 to 3.5:1/
a water activity of less than 0.85
a pH of about 6 to 7.5;
filling the headspace portion of the container that is unfilled with the batter with an inert gas having an oxygen content of less then 4%;
sealing the container for form a shelf stable ready-to-bake brownie article.

DETAILED DESCRIPTION OF THE PREFERRED EMBODIMENT

The present invention relates to packaged ready-to-bake batters for brownies characterized by shelf stability at room temperature and to their methods of preparation. Each of the product components as well as product use and attributes and methods of their preparation are described in detail below.

Throughout the specification and claims, percentages are by weight and temperatures in degrees Fahrenheit unless otherwise indicated.

The present articles or products essentially comprise a gas impermeable container; a low water activity high sugar to flour ratio brownie batter disposed within and partially filling the container; and an unpressurized, inert low oxygen gas in the unfilled headspace.

The container can be flexible or rigid or semi rigid and of any suitable shape or configuration.

For example, suitable for use for the gas impermeable container are widely available pouches fabricated from flexible laminate materials having low gas permeability. A suitable laminate is a polyester-aluminum-polyester laminate. Also useful are tubs fabricated from plastic, glass or metal. In other variations, the container or portions thereof can serve as a disposable baking container. For example, the container can comprise an aluminum or an ovenable plastic baking tray or tub having an overlaying peelable gas impermeable foil membrane. Having the container function as the baking container adds further convenience by eliminating transfer of the batter from the container to the baking utensil.

The articles further essentially include a ready-to-bake batter disposed within the container. The batters essentially comprise sugar, flour, fat, and moisture. Batters and doughs are distinguishable compositions even though each comprise some number of common ingredients.

"Dough" as used herein refers to an intermediate food product that has a gluten based structure. In dough, the gluten forms a continuous dough elastic medium into which other ingredients are embedded. A dough is typically prepared by beating, blending, cutting or kneading and is often stiff enough to cut into various shapes. Doughs generally are used for low sugar to flour ratio products such as breads, quick breads, biscuits, etc.

In contrast, "Batter" as used herein refers to an intermediate food product that essentially contains flour, water, eggs, and salt and optionally fat and sugar(s) that are a starch batter based composition. In a batter, gluten development is purposefully minimized. Batters are inelastic. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of a container.

Flour

The present batter compositions essentially contain from about 15 to 40% of the batter of flour. Conventionally, flour is standardized to a moisture content of about 14%. Flour(s) useful herein can be of conventional type and quality including cake flour, bread flour and all-purpose flour. Wheat flours are preferred but other flours conventionally used in the preparation of baked goods can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11 to 13% by weight. The preferred protein range for the wheat flour useful in this invention is between about 7 to 10% by weight of the flour. A good general all-purpose flour also can be used. Such all-purpose flour generally comprises a mixture of both hard and soft wheat flours, i.e., both high protein level and low protein level flours. Such flours are useful if the average protein content ranges from about 7 to 10% by weight.

While chlorinated flours can be used herein, preferred for use are unchlorinated flour since chlorination is an expensive but unnecessary flour processing step. However, malted flours that are typically used for bread making should be avoided. unmalted flours selected for use herein should be of high quality and desirably are from wheats with minimal sprout damage.

Sugar

The batter compositions of the present invention also essentially comprise from about 25 to 70% of the batter of a sugar or nutritive carbohydrate sweetener ingredient. Typically, sucrose is used in mixes for baked goods as the sugar ingredient, although up to about 30% of the sugar in the present brownies batters can be supplied by dextrose or by other nutritive carbohydrate sweetening agents, e.g., corn syrup solids. Commercially available milled sugar usually contains up to about 4% starch as an aid to maintaining its free-flowing properties.

Ordinary granulated sugars are satisfactory for use in the dry mix. These include sucrose, dextrose, maltose, fructose, lactose, brown and invert sugars, alone or in combination. The preferred sugar is sucrose.

Sugar to Flour Ratio

The baker's ratio is the weight ratio of sugar to flour. The baker's ratio is used to provide desired baked good attributes. The baker's ratio of the brownies batters herein can range from about 1.5:1 to 3.5:1, preferably about 2.0:1 and for best results about 2.5:1. Maintenance of the sugar to flour ratio within the range is important to providing finished baked goods having the desired eating qualities. The sugar-to-flour ratio is also important to obtaining the desired shelf storage at room temperature benefit provided by the present improved articles.

Fat Component

The present dry mix compositions can also comprise from about 0 to 20% of an edible fat or shortening ingredient. A shortening component adds richness to the eating properties of the finished baked goods.

In certain embodiments, the present batters provide finished baked goods that are low or even free of an added shortening ingredient especially those that comprise gellan gum. In those embodiments, shortening is either not included in the batter or used at levels only required to function as a carrier for the emulsifier ingredient described below, that is from about 0 to 5%, preferably about 1 to 5%.

Preferably, the present batter compositions are fat bearing embodiments that additionally comprise from about 1% to about 15% of the shortening ingredient. Better results fat bearing batters are obtained with shortening levels ranging from about 4 to 15%. Best results are obtained when the shortening component comprises about 4 to 8% of the present batters. Maintenance of shortening concentrations within these limits is important for providing baked goods of acceptable textural quality.

Surprisingly, the fat constituent provides a solute into which $N_2O$ gas dissolves as described in detail below.

Conventional shortening materials are suitable for use as the shortening ingredient of the present batters. Such conventional shortening materials are well known in the baked goods art. The conventional shortenings useful herein are fatty glyceridic materials which can be classified on the basis of their physical state at room temperature. Liquid shortenings or oils can be used and provide the advantage of ease of incorporation. Solid shortening can also be used and provides the advantage of desirable mouth feel upon cake consumption. More commonly, and preferred for use herein, are mixtures of liquid and solid shortenings. Such mixes can be fluid or plastic depending in part upon the level of solid fatty materials. Shortenings of this type comprise a liquid oil containing from about 2 to 26% normally solid fatty glycerides. That is, a solids content index ("SFI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil (e.g., sucrose polyesters) which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil and the like. Other suitable shortening materials and methods of shortening preparation are described in detail in Bailey, "Industrial Oil and Fat Products," (3rd ed. 1964) which is incorporated herein by reference.

Mixtures of the above oils can also be used herein as can solid fatty materials, such as saturated triglyceride fats. In general, from about 1.5 to 25% of triglycerides which are solid at 70° F. can be added to a liquid oil.

The preferred oils are soybean oil hydrogenated to an iodine value (IV) of from about 105 to 115, preferably about 107, corn oil, palm oil, hydrogenated palm oil, lard and tallow oils. Preferably the oils used to prepare the shortening composition will contain only from about 1 to 7% hardstock. Hardstock is an hydrogenated triglyceride having an iodine value of 8 or less. Preferred hardstocks are hydrogenated soybean oil, hydrogenated cottonseed oil, hydrogenated palm oil and hydrogenated lard or tallow.

The present batters further essentially comprise about 1 to 3% of emulsifier(s) preferably about 1 to 3%. The shortening provides a convenient carrier for addition of emulsifiers to the batter. Such emulsifiers aid the realization of baked goods with improved grain structure and texture. The emulsifier is also useful to maintain the emulsion integrity of the batter over extended room temperature storage.

The emulsifier typically comprises from about 1 to 20% of the shortening component, preferably from about 5 to 15% and, most preferably from about 10 to 15%.

Generally useful as the emulsifier component of the shortening ingredient are partially esterified polyhydric compounds having surface active properties. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecylglyceryl ether sulfate and monostearin phosphate. Other examples include the partial esters of hydroxycarboxylic acids, such as lactic, citric, and tartaric acids with polyhydric compounds, for example, glycerol lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

Moisture

The present batters have a total moisture content of 5% and about 20% preferably about 5 to 15% moisture. The total moisture includes water provided with or associated with the various essential and optional ingredients. For example, total moisture includes the moisture associated with flour, starch, cocoa and especially liquid eggs. The total moisture can be easily determined by vacuum oven drying of the batters herein. In preferred embodiments, no added water is employed to formulate the present batters. Moisture is provided pasteurized liquid eggs and the residual moisture associated with the dry ingredients.

The particular selection of ingredients and concentration are selected to provide batters having a water activity ranging from about 0.65 to 0.85 and for best results about 0.80 to less than 0.85. Selection of such water activity value is important to achieving a balance between microbial shelf stability and batter handling characteristics.

The present batters are preferably not acidified and thus range in pH from about 6.0 to 7.5. The batters herein are preferably essentially free of conventional leavening acids. The combination of a low oxygen gas in the headspace and a low water activity are sufficient to maintain shelf stability at room temperature.

If desired, the batters can further comprise about 1 to 8% of a humectant, preferably about 1% to 6%. Humectant addition is helpful to achieving the present essential water activity level and the microbial shelf stability at room temperature provided by the present articles. The humectant can be any commonly employed humectant ingredient. Preferred humectants are selected from the group consisting of sorbitol, xylitol, manitol, glycerin, glycerol, propylene glycol and mixtures thereof. Preferred for use herein is a mixture of sorbitol and glycerin.

In highly preferred embodiments, the present articles further comprise an anti-mycotic ingredient such as sodium, potassium sorbate, calcium propionate, or parabens. While not needed to maintain shelf stability addition of such antimycotic ingredients so desired from a food safety standpoint antimycotic in case the physical integrity of the article is comprised and oxygen leaks into the headspace. Preferred in calcium propionate or parabens 0 to 0.2%.

While the invention is specifically described in terms of improved brownies, other baked goods within the scope of this invention include bar cookies and chewy granola or snack bars. Brownies as used herein include both chocolate-flavored brownies and vanilla-flavored brownies, also known in the baked goods art as "blondies." When blondies are made, a vanilla flavor is substituted for cocoa in the batter at suitable concentrations.

Batters for chocolate brownies are preferred herein and generally comprise about 2 to 12% cocoa, preferably about 5 to 10%, and for best results about 7 to 8%.

The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, is to be encompassed by the term "cocoa". When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

It is an advantage of the present invention that the present batters do not require a conventional acid/soda chemical leavening system. In general, such chemical leavening systems are composed of a baking soda, e.g., sodium, potassium, or ammonium bicarbonate, etc., as a source of carbon dioxide on one hand, and one or more other common baking acids on the other. Maintaining the functionality of a chemical leavening system over time in a batter generally requires careful and expensive encapsulation of the acid, the soda, or both. Eliminating this expensive and problem ridden encapsulation, reduces both the cost and complexity of the batter as well as increasing the reliability of the present articles for the consumer.

In preferred embodiments, the present batters additionally comprise about 0.01 to about 0.2% gellan gum. Better results are obtained when the gellan gum comprises about 0.01 to 0.2% of the batter. For best results, the gellan gum can comprise about 0.015 to 0.12% of the batter.

Gellan gum is a heteropolysaccharide prepared by fermentation of Pseudomonas elodea ATCC 31461. Gellan gum is available from Kelco Division of Merck & Co., Inc., San Diego, Calif., under various names, including KELCOGEL, KELCOGEL IF, KELCOGEL PC, and KELCOGEL F. Processes for preparing gellan gum include those described in U.S. Pat. Nos. 4,326,052 and 4,326,053.

In preferred embodiments, gellan gum is the sole hydrophilic colloid. In other embodiments, however, the batter can additionally include conventional gum ingredients in addition to the gellan gum component.

If desired, the present batters can additionally comprise about 0.02 to 2% of a supplemental gum member selected from the group consisting of guar, xanthan, locust bean, carboxymethyl cellulose and mixtures thereof.

When gellan gum or other calcium setting hydrophilic colloids are added to the batters, the batter can further beneficially comprise about 10 to 50 ppm soluble calcium. The calcium can be provided by calcium chloride or other calcium salts.

Still another useful optional ingredient is starch. Starch addition can be used to influence a variety of product attributes including viscosity, finished baked goods' volume and texture. The starch used can be any of the common food starches, for example, potato starch, corn starch, wheat starch, rice starch, barley starch, oat starch, tapioca starch, arrowroot, and sago starch. Modified starches and pregelatinized starches can also be used. If present, the added starch ingredient(s) can comprise about 0.1 to 10%, preferably about 1 to 8% of the batter. The present dry mixes can optionally contain a variety of additional minor ingredients or "conventional additives" suitable for rendering finished baked goods prepared therefrom more organoleptically desirable. Such optional dry mix components include antioxidants, flavor/coloring agents, egg solids, salt, coloring agents, flavoring agents, flavor chips, nuts and fruit pieces, or other edible inclusions. Flavor chips include chocolate, mint chocolate, butterscotch, peanut butter chips and mixtures thereof. The flavor chips can be coated with topical film to minimize moisture immigration such as with a hard fat or with edible shellac. If present, such optional components collectively comprise from about 1 to 25% of the batter of the present invention.

Another highly preferred optional ingredient in the present batters is nonfat dry milk solids. Nonfat dry milk solids aid the structuring of the finished baked good. If present, such dry milk solids can comprise from about 0.5 to 2.0% of the present batters.

The present articles further essentially comprise an inert gas in head space of the container not occupied by the batter, e.g. $N_2$ or $CO_2$ or $N_2O$ or combination thereof. The residual oxygen content is less than 4%, preferably less than 2% and for best results less than 1%. In certain embodiments, the present articles comprise $N_2O$ in the headspace. The $N_2O$ is partially dissolved in the batters and is in equilibrium with the inert gas in the headspace. An advantage is that the $N_2O$ can function as the sole leavening agent in batters for brownies, especially those that comprise gellan gum. The brownies may or may not contain $N_2O$ dissolved in batter. $N_2O$ may be mixed with batter to get certain textural attributes such as cakiness.

METHOD OF PREPARATION

The batters of the present invention are prepared by blending the essential and optional components together in such a conventional manner as to produce a well blended batter. In a preferred method of preparation, a problem of the dry ingredients other than the gellan or other gums is made. If employed oil or shortening is melted to form a liquid. A portion of the water is used to prehydrate the gums and a portion to prehydrate the emulsifiers. Thereafter, the liquid ingredients are combined to form a wet mixture. The wet mixture and dry preblend are then combined under anaerobic conditions to form a batter. The batter can, for example, be prepared in a batch or a continuous mixing device adapted to add gas.

The batters are then charged to the container. The container is then flushed with an inert gas to insure low oxygen in the headspace. The containers are then sealed to form the finished ready-to-bake container articles. The articles enjoy extended shelf stability at room temperature and do not require refrigerated storage.

The temperature of batter during filling step can be at room to warm temperatures 70 to 125° F. preferably about 90 to 125° F.

The product is packaged to be substantially unpressurized. As a result, the package has an internal pressure of about 700 to 1,000 millibar of pressure.

DRY MIX COMPOSITION USE

The present batters are conveniently prepared into finished baked goods by simple addition to a suitable baking container or pan and baking to form a finished brownies baked good is charged into a baking container and baked for sufficient times, for example, at 160° to 200° C. (325 to 400° F.) for about 20 to 40 minutes to form a finished brownie baked good.

Baking time depends on the thickness of the batter in the pan, with a longer bake time required for a thicker (higher) batter. Bake times range between about 20 to 45 minutes. For a preferred, chewy brownie, bake times are between about 20 to 30 minutes. For a more cake-like brownie, a longer bake time is used, generally longer than 27 minutes.

The resultant finished baked goods are characterized by a highly moist but not sticky or tacky texture. The finished baked goods are ready for immediate consumption or can be prepared on a commercial scale for refrigerated distribution.

The packaged ready-to-bake brownies batter articles herein do not require heat treatment such as pasteurization or refrigeration in order to obtain shelf stability notwithstanding having a relatively high pH. The products enjoy microbial stability and retain their good baking properties for as long as four to nine months at room temperature storage.

What is claimed is:

1. A ready-to-bake article for brownies, comprising:
   an essentially gas-impermeable container;
   a batter disposed within the container, comprising:
      sugar, flour, edible fatty triglycerides, salt, moisture, said batter having a sugar to flour ratio of at least 1.5:1,
      a moisture content of about 5 to 20%,
      a water activity of less than 0.85; and
      a leavening system consisting of an inert gas disposed within the container and within the batter, the container containing less than 4% residual oxygen.

2. The batter article of claim 1 substantially free of a leavening system.

3. The batter article of claim 1 additionally comprising a leavening system.

4. The batter article of claim 3 wherein the leavening system includes $N_2O$.

5. The batter article of claim 1 shelf stable at room temperature.

6. The batter article of claim 4 wherein the inert gas includes $N_2O$ at least a portion of which is dissolved into the batter.

7. The batter article of claim 1 wherein the batter has a density between 0.6 to 1.2 g/ml.

8. The batter article of claim 6 having a pH of about 6 to 7.5.

9. The batter article of claim 1 wherein the batter additionally comprises about 1 to 10% cocoa.

10. The batter article of claim 8 wherein the batter additionally comprises about 1% to 8% of a humectant.

11. The batter article of claim 1 wherein the batter additionally comprises about 0.01 to 0.2% gellan gum.

12. The batter article of claim 8 wherein the humectant comprises glycerol or sorbital or a mixture thereof.

13. The batter article of claim 9 wherein the batter additionally comprises about 5 to 200 ppm calcium ions.

14. The batter article of claim 11 wherein the batter additionally comprises about 1 to 5% eggs (dry weight basis).

15. The batter article of claim 11 wherein the batter additionally comprises about 0.1 to 3% emulsifiers.

16. The batter article of claim 6 having a pressure within the container of about 760 to 1,000 mmHg and additionally contain sodium, potassium sorbate, benzoate, propionic acid, calcium propionate, or parabens.

17. A method of fabricating a ready-to-bake brownie article, comprising the steps of:

provoding an open sealable, gas impermeable container;

dispensing a brownie batter within at least a portion of the container, said brownies comprising:
about 25 to 70% sugar
about 10 to 40% flour
about 0 to 4% egg solids
about 0.1 to 3% salt
about 0 to 4% emulsifiers
about 0 to 20% fat
about 5 to 20% moisture
said batter having a sugar to flour ratio of about 1.5:1 to 3.5:1
a water activity of less than 0.85
a pH of about 6 to 7.5;
filling the headspace portion of the container that is unfilled with the batter with an inert gas having an oxygen content of less then 4%;
sealing the container for form a shelf stable ready-to-bake brownie article.

18. The method of claim 17 wherein the container is fabricated from a flexible material.

19. The method of claim 18 wherein the inert gas in the headspace has an oxygen content of less than 1%.

20. The method of claim 19 wherein the inert gas in the headspace comprises $N_2O$.

21. The method of claim 20 wherein the batter has an oxygen content of less than 1%.

22. The method of claim 21 wherein all the moisture is supplied by pasteurized eggs.

23. A ready-to-bake batter article for brownies, comprising:

an essentially gas-impermeable container;
a batter disposed within the container, comprising:
sugar, flour, edible fatty triglycerides, gellan gum, moisture, salt, the batter comprising a sugar-to-flour ratio of at least 1.5:1, and a water activity of less than 0.85; and
an inert gas disposed within the container containing less than 4% residual oxygen.

* * * * *